United States Patent [19]

Takekoshi et al.

[11] 4,279,163
[45] Jul. 21, 1981

[54] STRESS MEASURING APPARATUS

[75] Inventors: Yoshikazu Takekoshi; Takeshi Yagisawa, both of Yokohama, Japan

[73] Assignees: Tokyo Shibaura Denki Kabushiki Kaisha, Kawasaki; Shibaura Engineering Works Co., Ltd., Tokyo, both of Japan

[21] Appl. No.: 41,884

[22] Filed: May 23, 1979

[30] Foreign Application Priority Data

Jun. 2, 1978 [JP] Japan ................................ 53/66335
Jun. 6, 1978 [JP] Japan ................................ 53/67203
Apr. 6, 1979 [JP] Japan ................................ 54/41010

[51] Int. Cl.³ .......................................... F16B 31/02
[52] U.S. Cl. ..................................... 73/761; 324/209
[58] Field of Search ................ 73/761, 779, 141 A; 324/209

[56] References Cited

U.S. PATENT DOCUMENTS 3,866,462  2/1975  Fraudin ............................ 73/779
4,135,391  1/1979  Dahle ............................ 324/209 X

FOREIGN PATENT DOCUMENTS 51-869763 11/1976 Japan .
52-73780   6/1977 Japan .
442441     2/1936 United Kingdom .................... 324/209
427245     2/1975 U.S.S.R. ................................ 73/761

OTHER PUBLICATIONS

Abuku, S. et al., "A Magnetic Method . . . Stress." Experimental Mechanics, May 1971. pp. 217-223.

Primary Examiner—Jerry W. Myracle
Attorney, Agent, or Firm—Oblon, Fisher, Spivak, McClelland & Maier

[57] ABSTRACT

A residual stress measuring apparatus for sensing a magnetic state of an object to measure a residual stress of the object comprises a magnetic sensor for sensing a magnetic state of the object to provide its state in the form of current and voltage, an AC power source for feeding an AC power to the magnetic sensor, a wattmeter for multiplying the current and the voltage supplied from the magnetic sensor to provide a variation of a core loss, and a calculator for converting the variation of the core loss into a residual stress of the object.

6 Claims, 17 Drawing Figures

STRESS MEASURING APPARATUS

This invention relates to a stress measuring apparatus and, more particularly, to an apparatus for magnetically measuring the magnitude of a weight applied to a structure part such as a bolt.

There has been a phenomenon that the magnetic characteristic of a ferromagnetic material depends on a change of the stress of the material. In connection with this, S. Abuku and B. B. Cullity describes a method for determining stress by using a correlation between permeability and tensile stress in an article entitled "A Magnetic Method For The Determination Of Residual Stress" Experimental Mechanics, May 1971, pp 217 to 223. Y. Takekoshi et al describes in the Japan Examined Patent Application No. 44425/'76 published on Nov. 29, 1976 a method for nondestructively measuring stress of a structure part by measuring coercive force.

The former conventional stress measuring method using a permeability change, however, is susceptible for physical gaps existing in the magnetic circuit for measuring the permeability of an object to be measured. Actually, some gaps between the object and a magnetic sensor used is inevitable, however. Most of the magnetomotive force (ampere turns) produced by an exciting current is consumed in the gaps. For this, the gap lengths must be kept constant, since a variation of gap lengths results in an error of the permeability. Even if the gap lengths are kept constant, an amount of the permeability change, which arises from a change of the stress, depends only on the ampere turns of the magnetic circuit in the object, which is a part of the whole magnetic circuit including the gaps. Therefore, an amount of permeability change measured is small so that it is very difficult to accurately measure the permeability of the object.

In the latter conventional stress measuring method by using coercive force, the coercive force is detected as an exciting current value at the peak of the voltage induced in the secondary coil or at an instant that the flux density is zero. In other words, this method needs a measurement of the instantaneous value of AC current. When the application timing of a pulse to command the measurement of an instantaneous value is shifted from its correct one, even if the amount of the shift is slight, the measured magnetic flux inevitably goes off zero and the instantaneous value of the exciting current detected is also off its true instantaneous value. This leads to a measurement error. Particularly because of gaps between the magnetic sensor and the object, the exciting current to magnetize the gaps greatly changes, even if the magnetic flux is slightly off zero. This causes a measurement error.

Accordingly, an object of the invention is to provide a handy stress measuring apparatus which can accurately measure a stress.

Present invention comprises a magnetic sensor for sensing a magnetic state of an object, an AC power source for feeding an AC power to the magnetic sensor, a calculating means for calculating a variation of a core loss on the basis of an output supplied from the magnetic sensor, and means for converting the variation of the core loss into a stress of the object.

Other objects and features of the invention will be apparent from the following description taken in connection with the accompanying drawings, in which.

Figure 11:
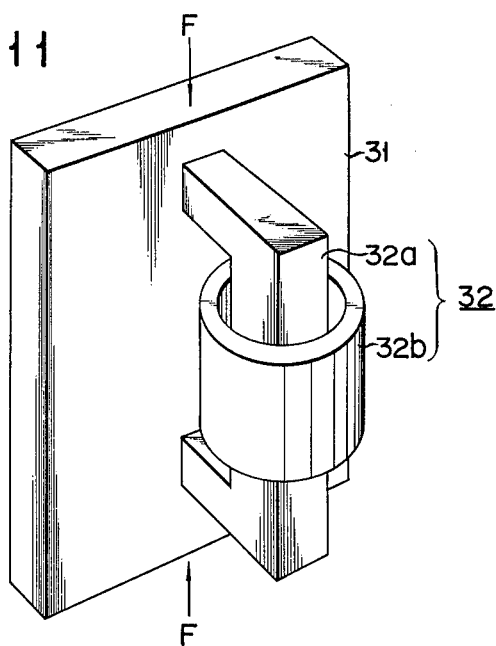
FIG. 11 shows still another example of the magnetic sensor.
Figure 13:
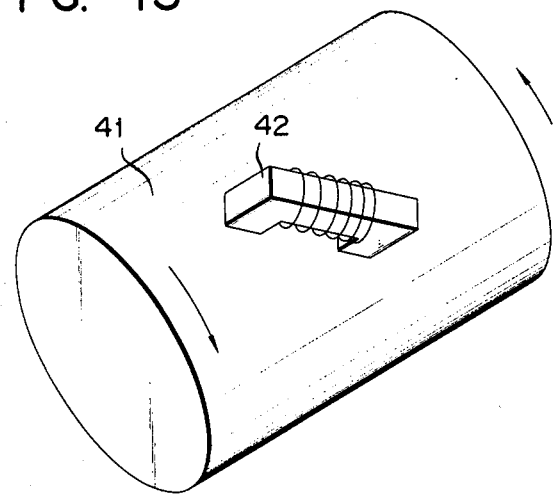
Figure 14:
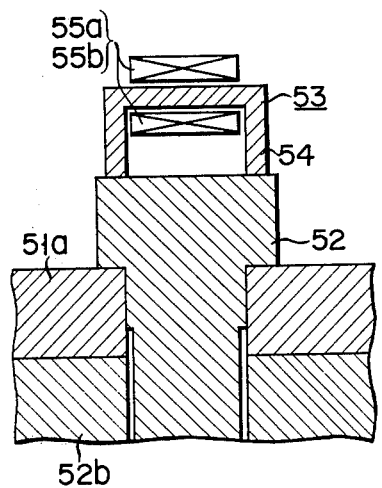
Figure 15:
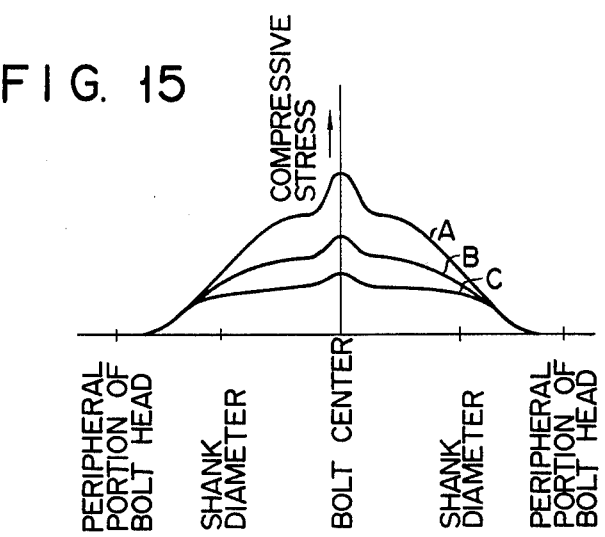
Figure 16:
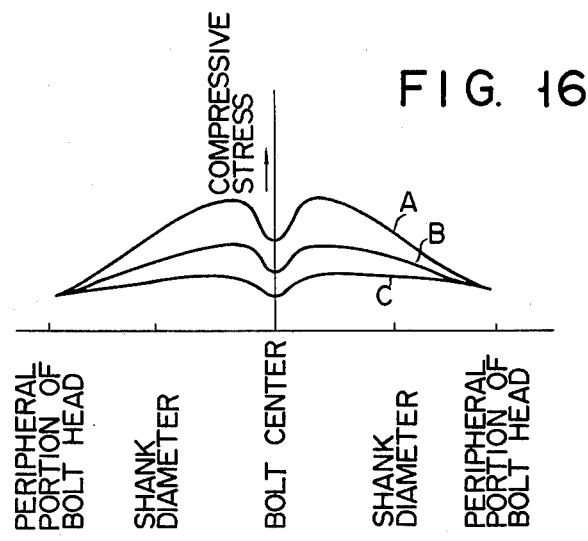
Figure 17:
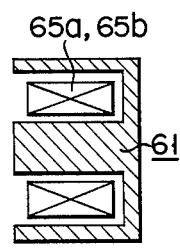

FIG. 13 diagrammatically illustrates another application of the use of the magnetic sensor in FIG. 11;

FIG. 14 shows a cross sectional view of another example of the magnetic sensor;

FIGS. 15 and 16 show radial and circumferential distribution of stress on the surface portion of a bolt head, respectively; and FIG. 17 shows another example of the magnetic sensor used in the stress measuring apparatus according to the invention.

Figure 1:
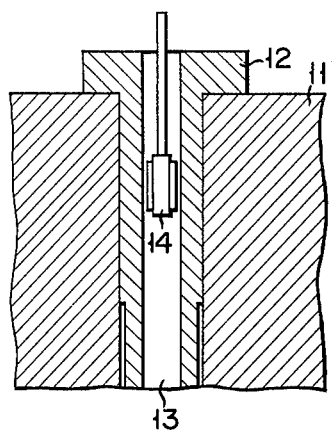
FIG. 1 shows a partial cross sectional view for illustrating a state that a magnetic sensor used in the invention is inserted in a hole of an object to be measured.
Figure 2:
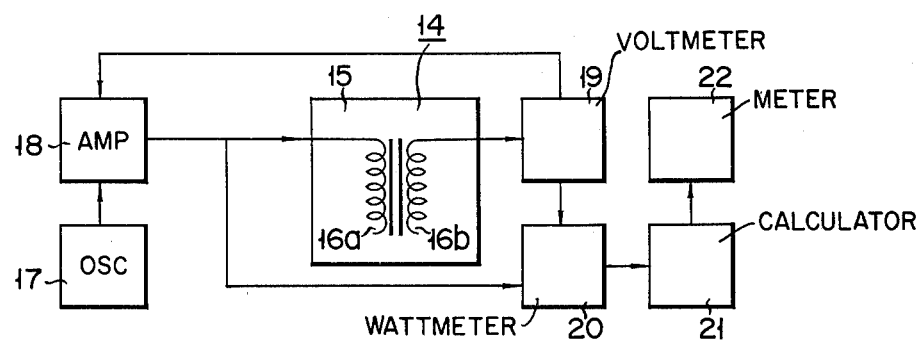
FIG. 2 shows a block diagram of a stress measuring apparatus according to the invention.

Referring now to FIG. 1, there is show a bolt 12 fastening a turbine runner 11. As shown, a magnetic sensor 14 which is a part of a stress measuring apparatus according to the invention is movably disposed in a guide hole 13 axially formed in the bolt 12. A circuit construction of the stress measuring apparatus according to the invention using such magnetic sensor 14 is illustrated in block form in FIG. 2. As shown, the magnetic sensor 14 is comprised of an iron core 15 wound by the primary and secondary coils 16a and 16b. The primary winding 16a is connected in receiving relation to an oscillator 17, via an amplifier 18. Through this route, the primary winding receives an AC voltage from the oscillator 17. The secondary winding 16b is coupled with a voltmeter 19 further connecting in feedback fashion to the amplifier 18. This feedback route provides a proper voltage which is induced in the secondary winding of the magnetic sensor 14 and in turn is measured by the voltmeter 19. A power meter 20 is coupled in receiving relation with the primary winding 16a and the output of the voltmeter 19. The output from the wattmeter 20 is applied to a calculator 21 where a changing rate of the core loss in the bolt 12 is calculated on the basis of the data coming from the wattmeter 20 and the stress in the bolt 12, or the tightening load, is calculated on basis of the changing rate of the core loss. Those calculated values are indicated by a proper meter 22. The calculator 21 may calculate only the changing rate of the core loss in the bolt. Preferably, it converts the changing rate calculated into the corresponding stress in a proper manner. An example of the calculator is comprised of a time-sharing multiplier supplied with the primary current and the secondary currents from the magnetic sensor 14, an analog to digital converter coupled at the input with the multiplier, a circuit for holding an initial value of the core loss or a value of the core loss at the time the stress is zero, and an arithmetic unit for calculating a changing rate of the core loss (the ratio of the core loss changing amount to the initial value) on the basis of the output signal from the holding circuit. These circuit components are commercially available.

The above-mentioned embodiment measured the core loss as the product of the primary current and the secondary voltage of the magnetic sensor 14.

Figure 3:
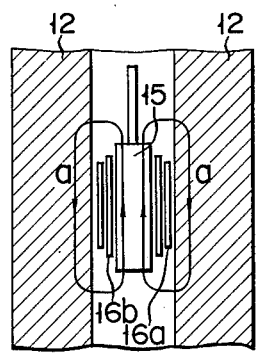
FIG. 3 shows a cross section for illustrating a magnetic path formed when the magnetic sensor is inserted in the object hole.

In operation, the magnetic sensor is inserted in the hole 13 and the oscillator 17 is driven. Upon the driving of the oscillator, the primary winding develops a magnetic field therearound so that the magnetic flux a developed passes in parallel with a tension developed in the bolt 12 and the space in the hole 13 and returns to the iron core 15 thereby to form a closed loop, as shown in FIG. 3. Under this condition, if a fastening or tightening load applied to the bolt 12 changes, the magnetic characteristic of the bolt also changes so that the exciting current flowing through the primary winding 16a changes together with the secondary voltage. Those are multiplied in the power meter 20 and then are converted into the corresponding core loss change rate and into the tightening load by the calculator 21.

Figure 4:
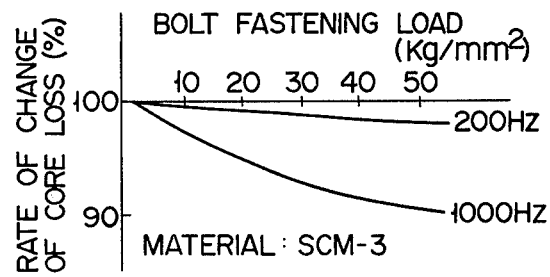
FIG. 4 shows a graph illustrating a relation of a core loss change rate to a bolt tightening load.

Turning now to FIG. 4, there is shown the results of an experiment conducted by the inventors. As seen from the graph, approximately 2% of the core loss change rate was obtained at 200 Hz within a range of bolt tightening load used, and was approximately 10% at 1000 Hz. These change rate values are sufficiently large compared with those obtained by the conventional method. When the frequency of the AC current applied to the magnetic sensor 14 is excessive, a skin effect takes place when the magnetic flux passes through the bolt 12. Accordingly, it is preferably below 1000 Hz.

Figure 5:
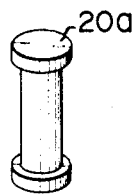
FIG. 5 shows a perspective view of an example of an iron core used in the magnetic sensor.

Turning now to FIG. 5, there is shown a preferable example of the magnetic sensor core 20a in the present invention. As shown, both ends of the iron core 20a are expanded to minimize the gaps between the sensor and the inner face of the bolt 12. Therefore, the magnetic reluctance in the magnetic path formed in its measurement is reduced to improve the sensitivity of the sensor 14. In this example, the primary and secondary windings are wound around the core section between both the expanded ends.

Figure 6:
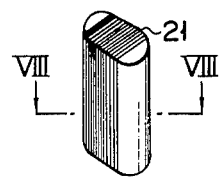
FIG. 6 shows a perspective view of another example of a magnetic sensor.
Figure 7:
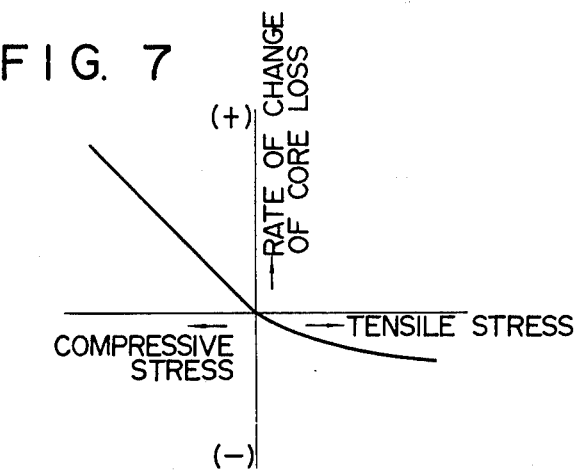
FIG. 7 shows a graph illustrating a relationship among core loss change rate, compressive stress and tensile stress.
Figure 8:
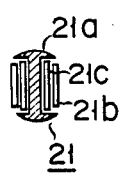
FIG. 8 is a cross sectional view of the sensor shown in FIG. 6 taken along line VIII—VIII in FIG. 6.
Figure 9:
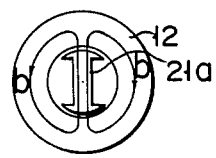
FIG. 9 shows a magnetic flux distribution developed when the magnetic sensor in FIG. 6 operates.
Figure 10:
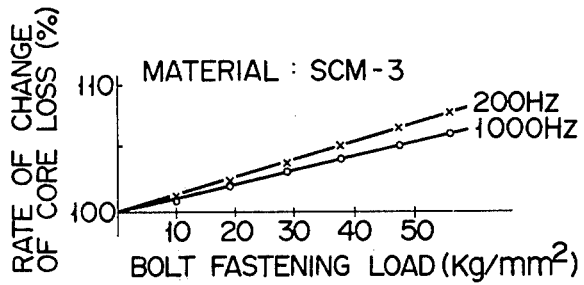
FIG. 10 shows a graph illustrating relation of core loss change rate to bolt fastening load.

Another example of the magnetic sensor will be given with reference to FIG. 6. As shown in FIG. 7, the magnetic characteristic of material depends more largely on a compressive stress than a tension stress. Accordingly, if the magnetic sensor is so constructed to effectively be sensitive to the compressive stress, it can more accurately detect the core loss change rate. The example in FIG. 6 is so constructed that it responds to the compressive stress to detect the core loss change rate. When the bolt is tightened, the stress exerting in the axial direction of the bolt acts as a tensile stress but that in the direction normal to the former as compressive stress. As shown in FIGS. 6 and 8, both sides of an iron core 21a are each shaped to be a half-circle in cross section with an outwardly curved outer surface. The primary and secondary windings are longitudinally wound around the core section between both sides. With such a construction, the magnetic flux developed emanates from one half-circled side of the iron core, enters into the bolt 12 where it passes therethrough in the circumferential direction in which the compressive stress exerts, and reenters the other half-circled side of the iron core where it passes therethrough from one to the other side, as shown in FIG. 9. Accordingly, the magnetic sensor thus constructed detects the compressive stress in proportion to the bolt tightening load. FIG. 10 shows a change of the core loss change rate with respect to the bolt tightening load when the magnetic sensor shown in FIG. 6 is used. In the case of the compressive stress, the core loss change rate positively changes as shown, and is larger than that in the case of the tension stress, while being substantially proportional to the tension stress.

When a given amount of alternate magnetic flux flows through a magnetic material, if the permeability of the magnetic material is high, the magnetic flux flows through only the surface portion of the magnetic material. If it is low, the magnetic flux deeply flows through the magnetic material because of the reactive action of eddy current produced. In this way, when the magnetic flux distribution changes, the core loss also changes. In this case, the core loss P is approximately given by:

$$P \propto f^{3/2} \cdot \delta^{\frac{1}{2}} \cdot \mu^{-\frac{1}{2}}$$

where f is frequency, $\delta$ is the conductivity of the object, and $\mu$ is the permeability of the object. This relation shows that the core loss increases as the permeability $\mu$ decreases. The permeability in the relation is that of the object per se and not the apparent permeability including the gaps. Therefore, even if the gaps are present in the magnetic circuit and the exciting current is large, the core loss is invariable. If the magnetic sensor is constructed taking this fact into consideration, it can accurately detect the core loss irrespective of the presence of the gaps.

An example of the magnetic sensor 32 constructed on the basis of such a fact is illustrated in FIG. 11. This example employs a U-shaped iron core 32a with the winding 32b wound around the bottom portion of the core. Of course, the winding 32b includes the primary and secondary windings. In use, the ends of both leg portions of the core 32a comes in contact with the surface of an object 31 to be measured.

In this example, the core loss takes place at two locations; one in the core 32a of the magnetic sensor 32 and the other in the object 31. However, if the material with a low core loss is selected for the core 32a, the core loss in the object 31 is predominant and that in the iron core is negligible. The sensitivity of the sensor is improved.

Figure 12:
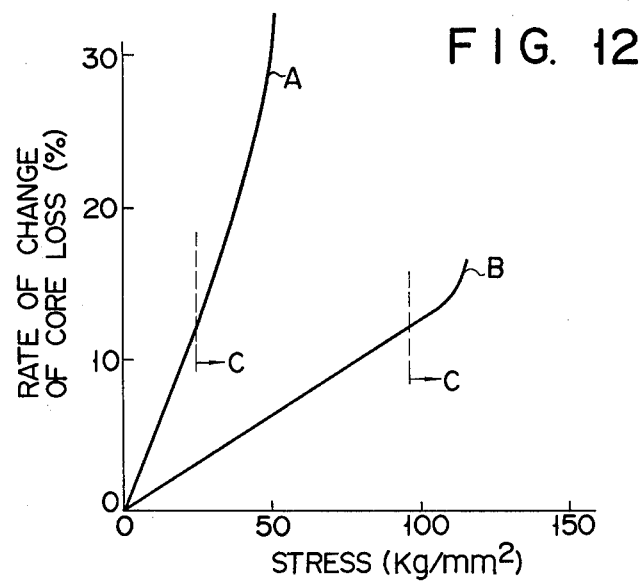
FIG. 12 shows a graph illustrating a relation of core loss change rate to stress.

FIG. 12 shows a relationship between the core loss change rate and a stress when tensile load is applied to the object and the magnetic sensor is disposed against the object normal to the magnetic sensor shown in FIG. 11. In the figure, a curve A indicates the characteristic of mild steel and a curve B that of alloy steel. Dotted lines C indicate the plastic deformation ranges of the materials just mentioned, respectively. In the direction the sensor is disposed, a compressive stress takes place in accordance with the Poisson ratio and the core loss increases. As seen from the graph, within the elastic areas, the core loss change rate and the stress are related in linear fashion. Therefore, within these areas, it is easy to convert the core loss change rate into the corresponding load.

If the magnetic sensor is rotated, the direction of the stress may be detected.

Turning now to FIG. 13, there is shown an application of the magnetic sensor shown in FIG. 11 into a torque measurement. The torque of the object is sensed by disposing the sensor 42 close to the surface of an ferromagnetic rotating member 41 and measuring the stress on the surface of the member 41. In the figure, the sensor is obliquely disposed against the member 41 in order to magnetize it in the main stress direction. As previously stated, since the compressive stress is superior to the tensile stress in measuring the core loss change ratio, the magnetic sensor 42 may be disposed normal to or in parallel with the axis of the rotating member 41. At this time, the core loss increases with the torque.

Turning now to FIG. 15, there is shown a radial distribution of stress in the surface portion of a bolt head when it is tightened. FIG. 16 shows a peripheral distribution of stress under the same condition. In the figures, curves A, B and C represent stress distribution curves in depths 0.5 mm, 1.5 mm and 2.5 mm from the bolt head surface, respectively. The stress is the compressive stress ranging approximately from 10 to 20 kg/mm$^2$ when 40 kg/mm$^2$ of the tightening or fastening load axially applied to the bolt. This relation of the bolt tightening load to the compressive stress change is linear within the elastic range. Therefore, when the magnetic sensor shown in FIG. 11 is disposed on the bolt head such that the flux flow in the bolt head is coincident with the compressive stress direction, the bolt tightening load may be obtained from the core loss characteristic sensed by the magnetic sensor. This is embodied by an example shown in FIG. 14.

In FIG. 14, the magnetic sensor 53 of the type shown in FIG. 11 is disposed on the head of a bolt 52 which is tightened to firmly coupled two members 51a and 51b. The magnetic sensor 53 is of course comprised of a U-shaped iron core 54 with primary and secondary windings 55a and 55b wound therearound. The AC excitation of the primary coil 55a of the sensor 53 forms a magnetic circuit including the bolt head and the core 54. In this case, the skin effect prevents the magnetic flux developed from deeply entering into the bolt head so that the flux flows through only the surface portion of the bolt head and returns to the sensor 53.

FIG. 17 shows another example of the magnetic sensor used in the stress measuring apparatus according to the invention. In this example, the iron core 61 is shaped like a letter W in cross section, as shown. The primary and secondary windings 65a and 65b are fitted in the space between the relatively thick center pole and the relatively thin peripheral wall of the iron core 61. In this example, the magnetic flux radially flows out from the center pole head, passes through the surface of the object and enters the top ends of the peripheral wall.

As described above, the stress measuring apparatus according to the invention measures the stress in the object by using the core loss enjoys the following beneficial effects.

The core loss measured by the measuring apparatus is little influenced by gaps between the magnetic sensor and the object. This is very important in this type measuring apparatus, because such gaps is inevitable in practical use of the sensor.

The conventional measuring apparatus using the corecive force needs a measurement of an instantaneous value, i.e. a differential value of the secondary induced voltage. On the other hand, the measuring apparatus according to the invention measures a time integration of the core loss. In other words, the former measures a point of a hysterisis loop while the latter measures an area defined by the loop. Therefore, the measuring apparatus of the invention enjoys little measuring error.

What we claim is:

1. A stress measuring apparatus for sensing a magnetic state of an object to measure a stress of the object comprising:
   a magnetic sensor for sensing magnetic state of the object;
   an AC power source for feeding an AC power to said magnetic sensor;
   calculating means for calculating a variation of a core loss on the basis of an output supplied from said magnetic sensor; and
   means for converting the variation of the core loss into a stress of the object.

2. A stress measuring apparatus according to claim 1, wherein the stress represents a load applied to the object.

3. A stress measuring apparatus according to claim 1, wherein the stress represents a torque applied to the object.

4. A stress measuring apparatus according to claim 1, wherein the object is a bolt and the stress is a tightening load applied to the bolt.

5. A stress measuring apparatus for sensing a magnetic state of an object to measure a stress of the object comprising:
   a magnetic sensor for sensing the magnetic state of the object, comprised of an iron core with the primary and secondary windings wound therearound and the current fed to the primary winding and the voltage induced in the secondary winding form output signals of said magnetic sensor;
   an AC power source for feeding an AC power to said magnetic sensor;
   calculating means for calculating a variation of a core loss on the basis of an output supplied from said magnetic sensor; and
   means for converting the variation of the core loss into a stress of the object.

6. A stress measuring apparatus for sensing a magnetic state of an object to measure a stress of the object where the object is a bolt and the stress is a tightening load applied to the bolt, comprising:
   a magnetic sensor for sensing the magnetic state of the object, wherein said magnetic sensor is attached to the bolt in a manner that the magnetic flux developed in the bolt by said magnetic sensor coincides in the direction with a compressive stress whereby the compressive stress in the portion of the bolt where the magnetic flux passes, represents a tightening load applied to the bolt;
   an AC power source for feeding an AC power to said magnetic sensor;
   calculating means for calculating a variation of a core loss on the basis of an output supplied from said magnetic sensor; and
   means for converting the variation of the core loss into a stress of the object.

* * * * *